A basic idea of this system is to separate ordered delivery data and unordered delivery data in a security protocol running on top of a reliable transport protocol, and perform a first type of security processing for ordered delivery data and a second different type of security processing for unordered delivery data in the security protocol. Preferably, data messages using ordered delivery and data messages using unordered delivery within a secure data stream are separated into two message sequence spaces on the security protocol layer, and data security processing is then performed differently in these two spaces. This system is particularly suitable for a reliable transport protocol such as SCTP (Stream Control Transmission Protocol). The security protocol running on top of the transport protocol is preferably based on the TLS (Transport Layer Security) or a TLS-like protocol with a security processing extension for unordered delivery.

United States Patent
Chen et al.

(10) Patent No.: US 8,352,727 B2
(45) Date of Patent: Jan. 8, 2013

(54) PROTECTION OF DATA DELIVERED OUT-OF-ORDER

(75) Inventors: Ta-wei Chen, Taipei (TW); Karl Norrman, Stockholm (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 1245 days.

(21) Appl. No.: 11/883,052

(22) PCT Filed: Mar. 9, 2006

(86) PCT No.: PCT/SE2006/000312
§ 371 (c)(1),
(2), (4) Date: Jul. 26, 2007

(87) PCT Pub. No.: WO2006/104438
PCT Pub. Date: Oct. 5, 2006

(65) Prior Publication Data
US 2008/0307528 A1 Dec. 11, 2008

Related U.S. Application Data
(60) Provisional application No. 60/666,597, filed on Mar. 31, 2005.

(51) Int. Cl.
H04L 29/06 (2006.01)
(52) U.S. Cl. .......................... 713/151; 726/14
(58) Field of Classification Search .................. 713/151, 713/160, 161; 726/14
See application file for complete search history.

(56) References Cited

U.S. PATENT DOCUMENTS
7,360,075 B2 * 4/2008 VanHeyningen et al. ..... 713/151
7,843,968 B2   11/2010 Okamoto et al.

FOREIGN PATENT DOCUMENTS
JP  2003-179640  6/2003
JP  2004-080070  3/2004
JP  2004-180253  6/2004
WO  2006/104438  10/2006

OTHER PUBLICATIONS
R. Stewart, et al., "Stream Control Transmission Protocol", RFC 2960, IETF, Oct. 2000.

(Continued)

Primary Examiner — Gilberto Barron, Jr.
Assistant Examiner — Virginia T Ho
(74) Attorney, Agent, or Firm — Nixon & Vanderhye, P.C.

(57) ABSTRACT

23 Claims, 14 Drawing Sheets

OTHER PUBLICATIONS

3GPP TS.33.220: "Generic Authentication Architecture (GAA); Generic bootstrapping architecture (Release 6)", Sep. 2004.

S. Kent and R. Atkinson, "IP Authentication Header", RFC 2402, IETF, Nov. 1998.

S. Kent and R. Atkinson, "IP Encapsulating Security Payload (ESP)", RFC 2406, IETF, Nov. 1998.

T. Dierks and C. Allen, "The TLS Protocol—Version 1.0", RFC 2246, IETF, Jan. 1999.

E. Rescorla, N. Modadugu, "Datagram Transport Layer Security", Internet Draft, Jun. 2004.

International Search Report mailed Jun. 12, 2006.

International Preliminary Report of Patentability dated Jun. 14, 2007.

Notification of the Recording of a Change dated Oct. 24, 2006.

Unurkhaan E. et al.: "Secure SCTP—A Versatile Secure Transport Protocol," Telecommunications Systems, vol. 24, Nos. 2-4, Oct. 2004, pp. 273-296 XP0023487271.

Rosenberg Cisco Systems H Schulzrinne Columbia University G Camarillo Ericsson J: "The Stream Control Transmission Protocol (SCTP) as a Transport for the Session Initiation Protocol (SIP); draft-ietf-sip-sctp-06.txt;" IETF Standard-Working-Draft, Internet Engineering Task Force, IETF, CH, vol. sip. No. 6, Jan. 13, 2005, XP015039048.

Fu S et al.: "SCTP: State of the Art in Research, Products and Technical Challenges," IEEE Communications Magazine, IEEE Service Center, New York, NY, US, vol. 42, No. 4, Apr. 2004, pp. 64-76, XP001195268.

Jungmaier University of Essen E Rescorla RTFM Inc M. Tuexen Siemens AG A: "Transport Layer Security over Stream Control Transmission Protocol; rfc3436.txt;" IETF Standard, CH, Dec. 2002, XP015009219.

Unurkhaan, E. et al.—"Secure SCTP—A Versatile Secure Transport Protocol"—Telecommunication System, vol. 24, No. 2-4, Oct. 2004, pp. 273-296.

Rosenberg, et al.—"The Stream Control Transmission Protocol (SCTP) as a Transport for the Session Initiation Protocol (SIP)"—IETF Standard-Working-Draft, Internet Engineering Task Force vol. sip, No. 6, Jan. 13, 2005.

Fu, S., et al.—"SCTP: State of the Art in Research, Products, and Technical Challenges"—IEEE Communications Magazaine, vol. 42, No. 4, Apr. 2004, pp. 64-76.

Jungmaier, A., et al.—"Transport Layer Security over Stream Control Transmission Protocol"—IETF Standard, Internet Engineering Task Force, rfc3436, Dec. 2002.

E. Rescorla, et al., *Datagram Transport Layer Security*, Internet-Draft, <draft-rescorla-dtls-05.txt>, [online], The Internet Engineering Task Force, Jun. 2004, URL: http://tools.ietf.org/pd/draft/rescorla-dtls-05.pdf.

\* cited by examiner

PROTECTION OF DATA DELIVERED OUT-OF-ORDER

This application is the U.S. national phase of International Application No. PCT/SE2006/000312 filed 9 Mar. 2006 which designated the U.S. and claims priority to U.S. Provisional No. 60/666,597 filed 31 Mar. 2005, the entire contents of each of which are hereby incorporated by reference.

TECHNICAL FIELD

The present system generally relates to security aspects of reliable transport protocols, and especially to protection of data delivered out-of-order.

BACKGROUND

In general, the system concerns reliable transport protocols supporting ordered delivery of data as well as unordered delivery of data. The stream control transmission protocol (SCTP) [1] is an example of such a transport protocol, developed in the SIGTRAN working group of IETF. It was originally designed for carrying PSTN telephony signaling messages. However, since it has several useful features that are not available in TCP, it is now seen as a general-purpose transport protocol and an alternative to TCP.

Normally, within a SCTP stream, data messages are delivered in order according to their stream sequence number. If a data message arrives out of order in the receiving endpoint (i.e. earlier), it must be held from delivery to the upper layer until all the messages in front of it are received and delivered to the upper layer. An SCTP endpoint can indicate that no ordered delivery is required for a particular DATA chunk transmitted within the stream. When an endpoint receives a DATA chunk indicated for unordered delivery, it may bypass the ordering mechanism and immediately deliver the data to the upper layer, as illustrated in FIG. 1 showing SCTP unordered delivery.

Unordered delivery helps avoiding head of line (HOL) blocking when applications are dealing with large amounts of independent transactions. HOL blocking occurs when multiple independent transactions are carried by a single data stream in order (e.g. a TCP connection) and some data in one of the transactions is late; all the other transactions after it are blocked from delivery to the upper layer and have to wait until the late data arrives even if they are not correlated to the transaction with late data arrival.

One example of this kind of application is the transport of SIP signaling messages between two SIP proxies 10-A, 10-B (e.g. call setup/teardown messages, billing information, and route query messages) for multiple SIP agents 20-A, 20-B, as illustrated in FIG. 2 showing SIP proxies exchanging signaling messages using SCTP as the transport protocol. These SIP signaling messages are independent of each other; the order of arrival of these signaling messages does not matter. However, it is important that they arrive timely. Using the unordered delivery of SCTP to carry SIP signaling messages between SIP proxies avoid HOL blocking present in TCP; with SCTP unordered delivery, the loss of a SIP message of a SIP transaction does not adversely affect the timely delivery of SIP messages of other transactions. HOL blocking can also be avoided by using the multi-streaming feature of SCTP (i.e. assign each SIP transaction its own SCTP stream). However, this requires more stream resources and might not be feasible. In [2], it was explicitly specified that a SIP entity SHOULD send every SIP message over stream zero with the unordered delivery when SCTP is used to carry SIP signaling messages.

Another example is the transport of AAA (Authentication, Authorization, and Accounting) messages. When a user authenticates to a security gateway or other entity in a network, the entity typically does not contain the vital information needed to authenticate the user. Instead the DIAMETER protocol is used to retrieve session authentication information from an AAA server, as illustrated in FIG. 3 showing a typical authentication use-case with a DIAMETER server. To avoid HOL blocking the interface between the AAA server 30 and the access gateway 40 can use the unordered delivery method of SCTP, or establish a separate reliable stream for each user 50. The interface is usually protected, and the TLS (Transport Layer Security) protocol is a common choice here. Since TLS cannot be used with unordered delivery (as will be shown below) multi-streaming is often used, which, as mentioned, requires more stream resources. An example where this system setup is used is the Generic Bootstrapping Architecture defined in [3].

It has been stated in [1] that the data security of SCTP associations can be achieved by using the IP authentication header (AH) [4] or the IP encapsulation header (ESP) [5] in the network layer. However, AH and ESP are not compatible with devices such as middle boxes. The data security of SCTP associations can also be achieved by using the transport layer security (TLS) protocol [6] on top of the transport layer, but only for ordered delivery. Usage of TLS over SCTP for ordered delivery has been described in [7]. Reference [8] describes the DTLS (Datagram Transport Layer Security) protocol, which is a datagram-compatible modification of TLS using sequence-number-based processing for all DTLS records.

SUMMARY

The present system overcomes these and other drawbacks of the prior art arrangements.

It is a general object of the present system to improve the security for a reliable transport protocol that supports ordered delivery of data as well as unordered delivery of data.

In particular it is desirable to provide a security solution on top of the transport layer for data that uses the unordered delivery feature, as will be explained later.

It is also desirable to provide the required security without wasting valuable stream resources.

It is a specific object to provide a method and system for providing data security for a reliable transport protocol that supports ordered delivery of data as well as unordered delivery of data.

It is another specific object of the system to provide a receiver and a transmitter configured to operate based on a reliable transport protocol that supports ordered delivery of data as well as unordered delivery of data.

Yet another object is to provide a dispatcher configured to operate in conjunction with such a transport protocol.

These and other objects are met by the system as defined by the accompanying patent claims.

A basic idea of the system is to separate ordered delivery data and unordered delivery data in a security protocol running on top of a reliable transport protocol, and perform a first type of security processing for ordered delivery data and a second different type of security processing for unordered delivery data in the security protocol. Preferably, data messages using ordered delivery and data messages using unordered delivery within a secure data stream are separated into two message sequence spaces on the security protocol layer, and data security processing is then performed differently in these two spaces.

The system is particularly suitable for a reliable transport protocol such as SCTP (Stream Control Transmission Protocol). The security protocol running on top of the transport protocol is preferably based on the TLS (Transport Layer Security) or a TLS-like protocol with a security processing extension for unordered delivery. It should however be understood that other combinations of security and transport protocols can be made.

It is advantageous to introduce a special message type dedicated to unordered messages to enable identification of such messages. On the transmitting side, each message of the new message type is preferably assigned an explicit sequence number from a special sequence number space dedicated to unordered messages. On the receiving side, the security processing for unorderly delivered messages is then normally based on processing of the explicit sequence numbers carried by the unorderly delivered messages.

In order to effectuate replay protection for unorderly delivered messages in an efficient manner, it is beneficial to maintain a list of those messages that have been received, or alternatively of those messages that have not been received.

For data dropping protection, a termination message for termination of a security protocol connection generally includes an end sequence number of the sent unordered data messages, and reliable reception of all sent records in the unordered record space may then be detected based on the end sequence number in the termination message.

The system is highly compatible and fully operable with existing protocols such as UDP, DCCP, and PR-SCTP.

The system offers the following advantages:

Improved data security.

A robust and efficient security solution on top of the transport layer for data that uses the unordered delivery feature.

Data security with efficient utilization of valuable stream resources.

Highly compatible with existing underlying transport protocols.

Other advantages offered by the system will be appreciated when reading the below description of embodiments of the system.

BRIEF DESCRIPTION OF THE DRAWINGS

The system, together with further objects and advantages thereof, will be best understood by reference to the following description taken together with the accompanying drawings, in which.

DETAILED DESCRIPTION

Figure 1:
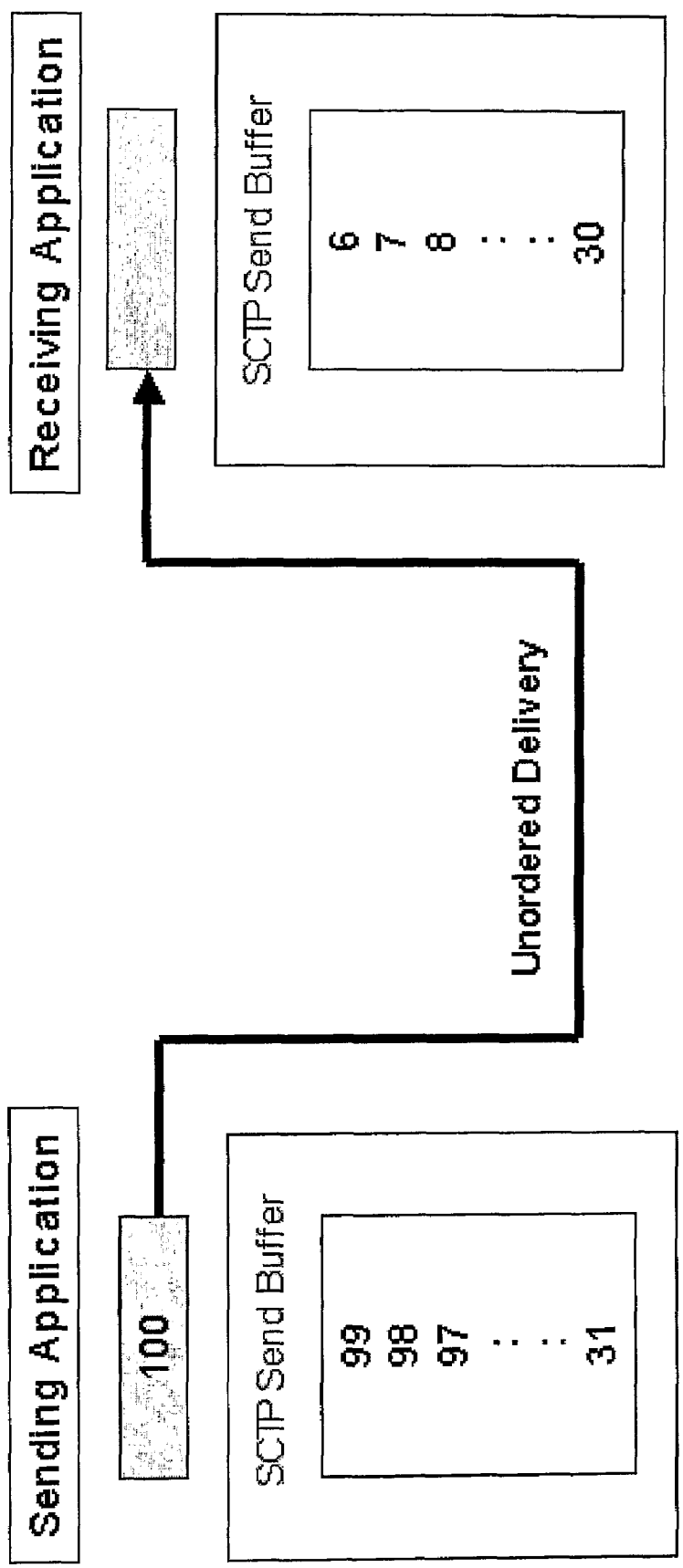
FIG. 1 is a schematic diagram illustrating SCTP unordered delivery.
Figure 2:
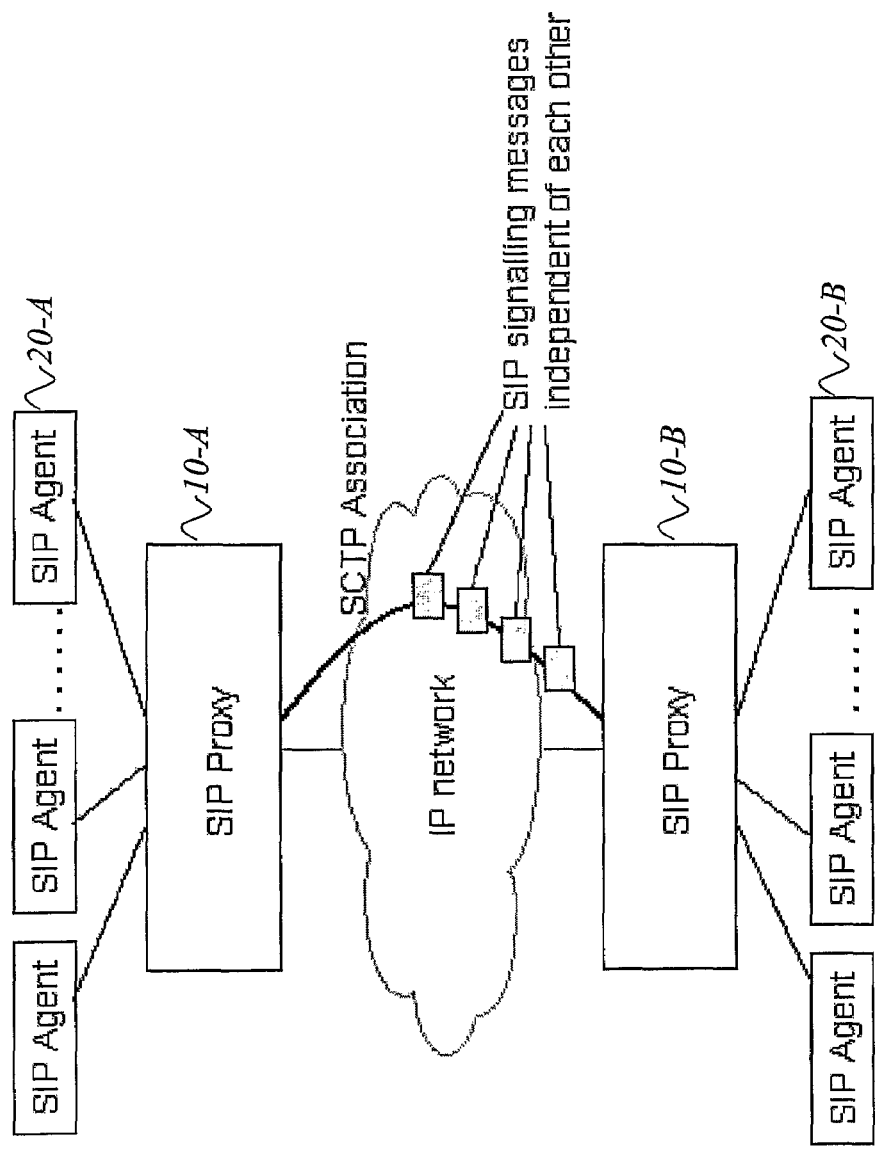
FIG. 2 shows SIP proxies exchanging signaling messages using SCTP as the transport protocol.
Figure 3:
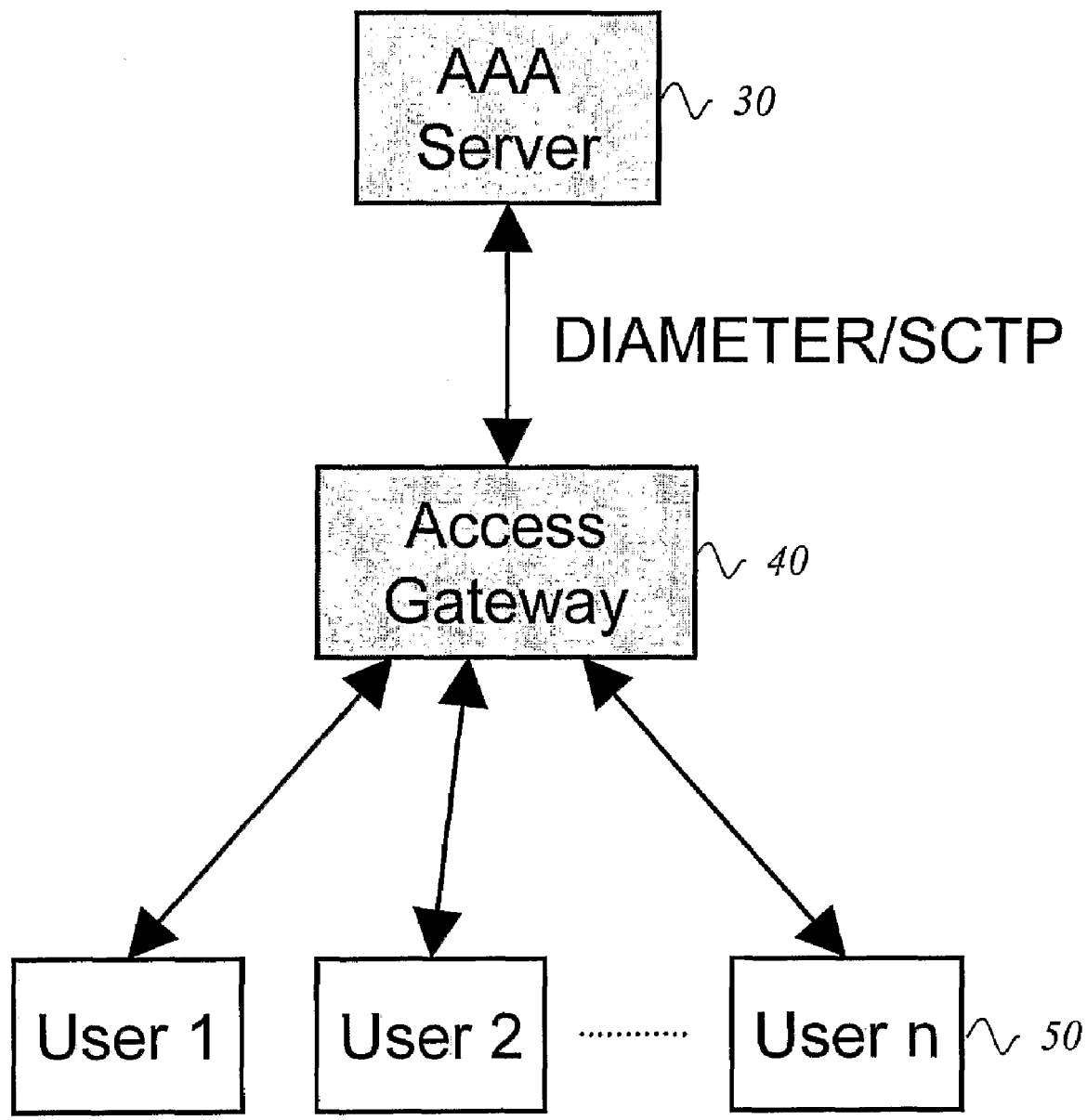
FIG. 3 shows a typical authentication use-case with a DIAMETER server.

Throughout the drawings, the same reference characters will be used for corresponding or similar elements.

It will be useful to begin with a problem analysis in a specific exemplary context. SCTP associations that use unordered delivery features can be protected by AH and ESP. However, AH and ESP are not compatible with devices such as middle boxes (e.g. middle boxes doing TCP performance optimization, header compression, application gatewaying, firewalling, NATing, etc.) because these middle boxes may need to access or even manipulate transport headers. Therefore, the inventors have recognized the need for a security solution on top of the transport layer for data that uses the unordered delivery feature of protocols such as SCTP.

Figure 4:
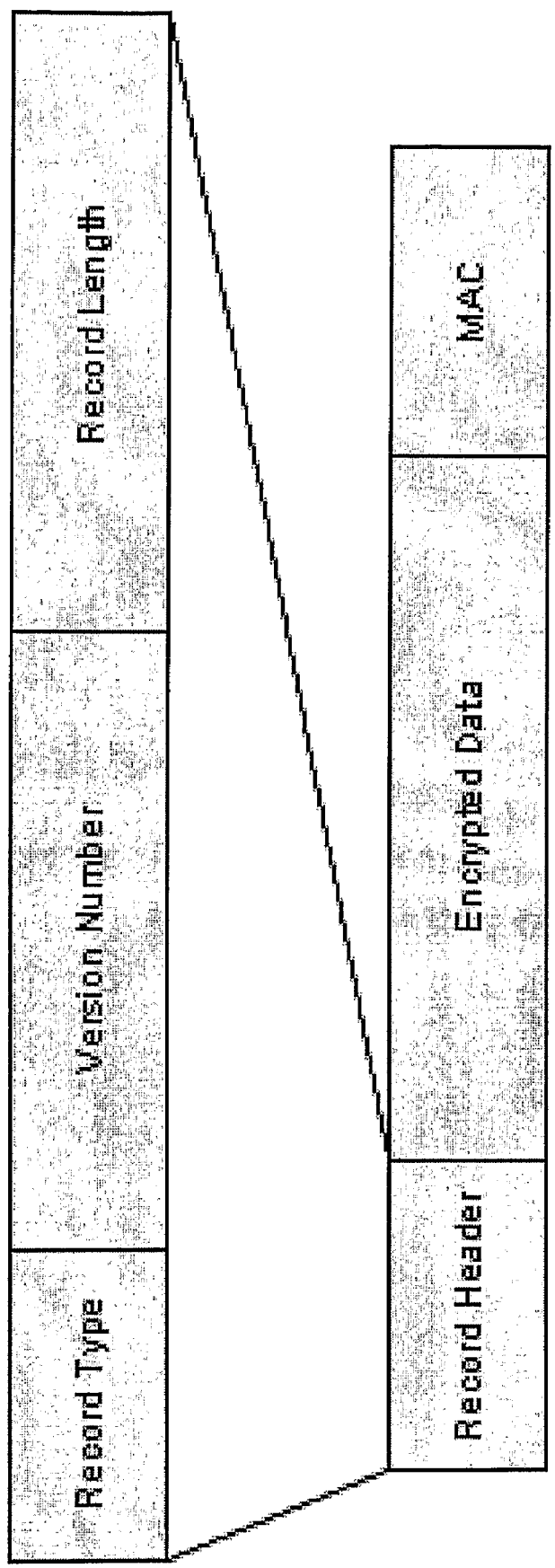
FIG. 4 illustrates the format of a conventional TLS data record.

TLS is an exemplary security protocol running on top of the transport layer. TLS was originally designed for protecting data over TCP connections. TLS divides a data stream into segments, performs security processing including encryption and authentication over each segment and encapsulates the processed segments into data records. In TLS, data chunks or data messages are normally referred to as records. The format of a conventional TLS data record is illustrated in FIG. 4, and includes a record header, encrypted data, and a MAC (Message Authentication Code). The record header normally includes a record type field, a version number and information on record length.

Figure 5:
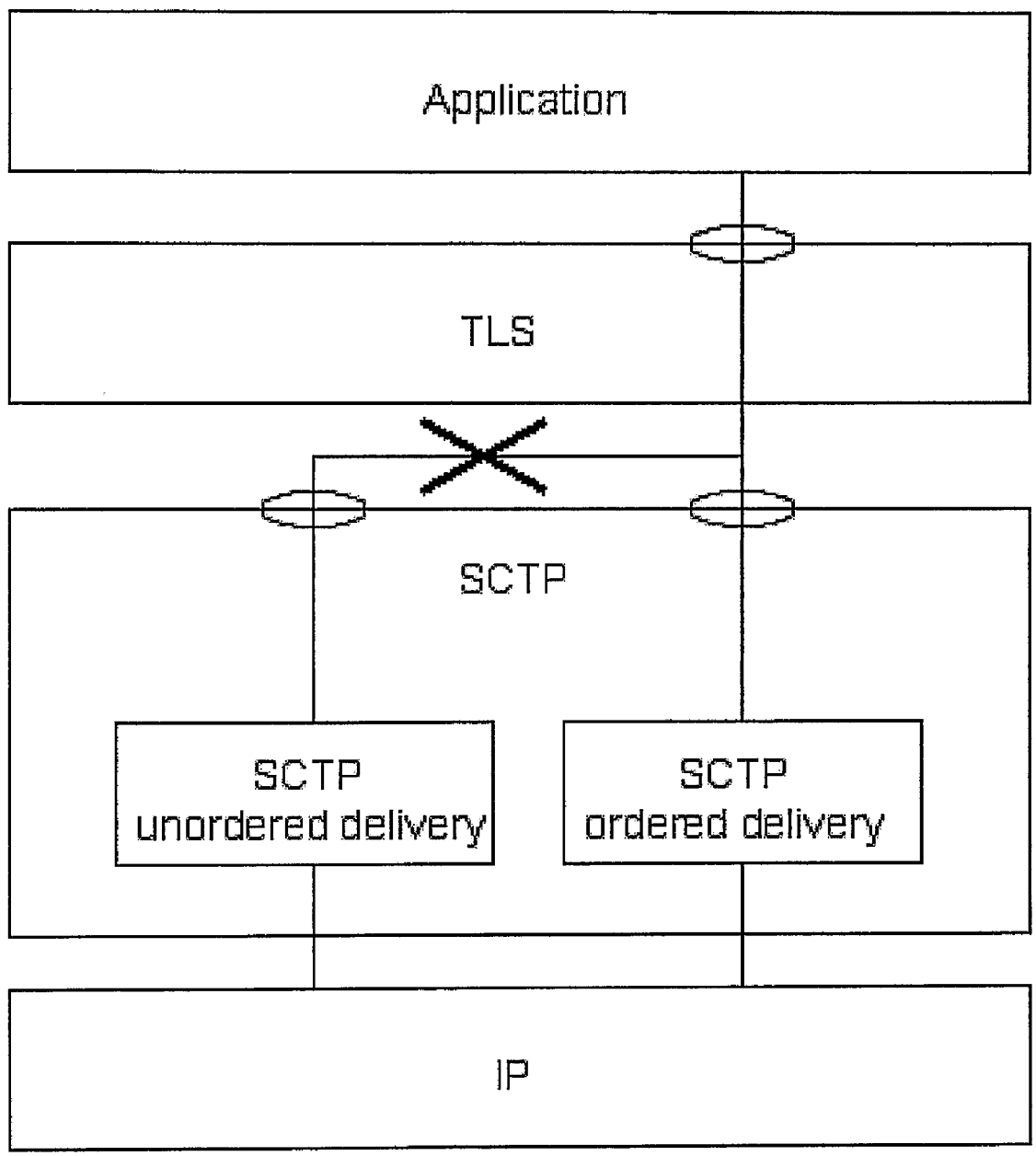
FIG. 5 shows the current TLS support of SCTP services of the prior art.

TLS assumes that all the data records arrive in order and performs security processing based on this assumption. Therefore, even though TLS supports SCTP when the data is delivered in order, TLS cannot handle data that use unordered delivery. In reference [7], it was explicitly specified that the unordered delivery feature of SCTP must not be used together with TLS, as illustrated in FIG. 5 showing the current TLS support of SCTP services. In the protocol stack of FIG. 5, it can be seen that TLS is not to be used for SCTP unordered delivery, but only for SCTP ordered delivery.

Figure 6:
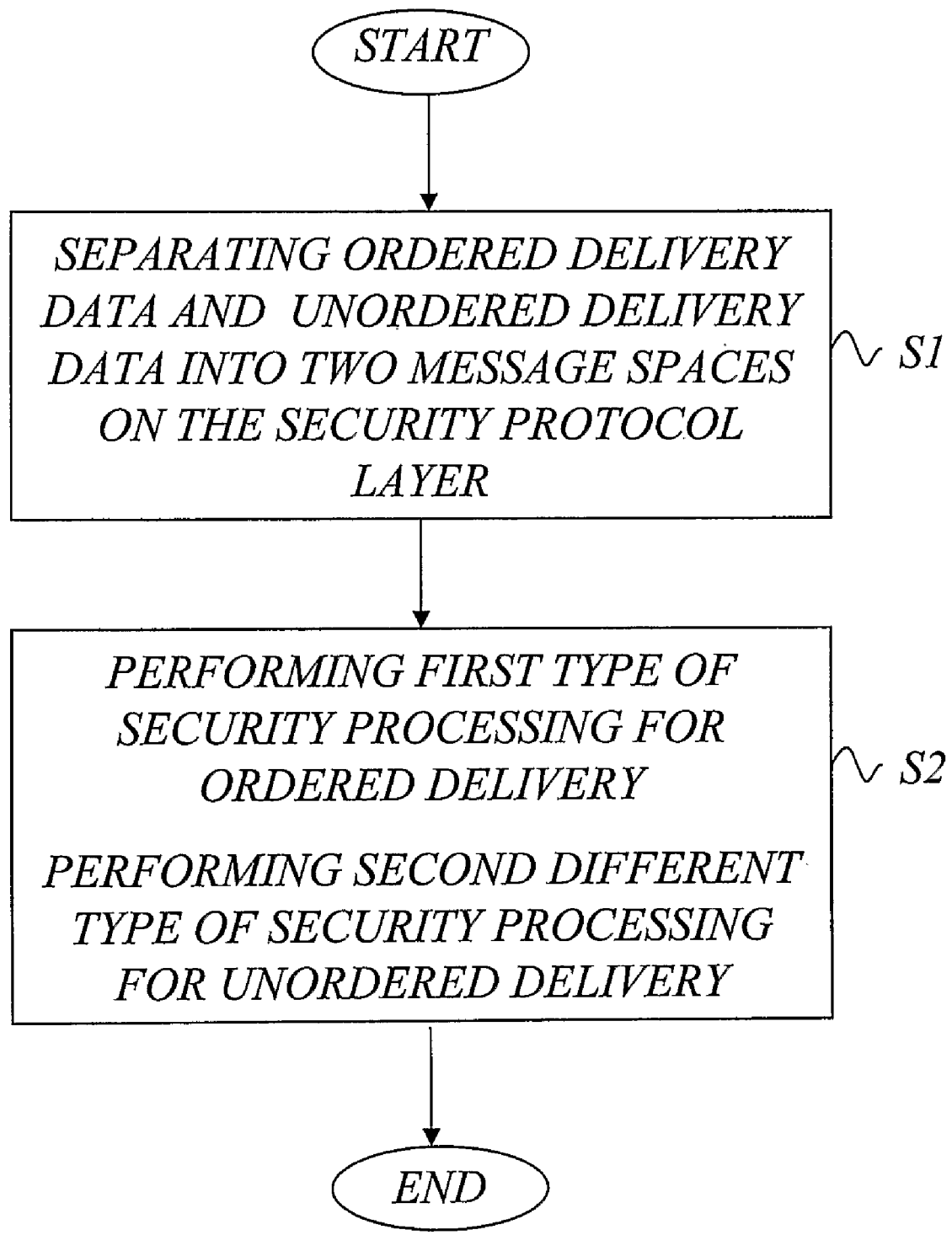
FIG. 6 is a schematic flow diagram of a method for improved data security for a reliable transport protocol according to an exemplary preferred embodiment.

In general, a basic idea of this system is to separate (S1) data messages for ordered delivery and data messages for unordered delivery into two message sequence spaces on the security protocol layer, and perform (S2) data security processing differently in these two spaces, as schematically illustrated in the flow diagram of FIG. 6. The state-of-the-art security protocols of today such as TLS cannot make this distinction. The idea of the system is to design/extend a security protocol, on top of the transport layer, to allow a separation of ordered and unordered delivery data at the security protocol layer and to perform different types of security processing depending on the type of delivery.

Reference [8] describes the DTLS protocol, which actually provides for unordered delivery. However, in DTLS, all records contain an explicit sequence number and all packets are security processed in the same way based on the sequence numbers.

The present system distinguishes over DTLS in that ordered delivery records and unordered delivery records are separated into two different record sequence spaces, and data security processing is performed differently for ordered delivery and unordered delivery. In particular, a sequence number is only inserted for packets that are out of order whereas DTLS inserts such a number for each record. Thereby, the inventive solution saves bandwidth and can be made compatible with legacy TLS.

A further difference is that DTLS provides a fixed size of the replay window whereas another method is used to keep track of records that are out of order, the method accounting for any size of the gap of missing sequence numbers.

The system is generally applicable to reliable transport protocols and security protocols designed to run on top of the transport layer. However, the system is particularly suitable for SCTP (Stream Control Transmission Protocol) in combination with a security protocol based on TLS (Transport Layer Security) with basic security processing for SCTP ordered delivery and a security processing extension for SCTP unordered delivery. In such a scenario, the use of the security processing extension is typically negotiated during session set-up, for example by means of an in-band procedure such as a handshake procedure or by means of out-of-band signaling.

On the transmitting side, the security processing for unordered delivery is preferably configured for assigning, to each unordered data message, an explicit sequence number from a sequence number space dedicated to unordered messages. On the receiving side, the security processing for unorderly delivered messages is then normally based on processing of the explicit sequence numbers carried by the unorderly delivered messages.

In the following, the system will mainly be described with reference to the particular exemplary protocols SCTP and TLS. As mentioned, the system is generally not limited thereto, and it should be understood that other combinations of security and transport protocols can be made.

Figure 7:
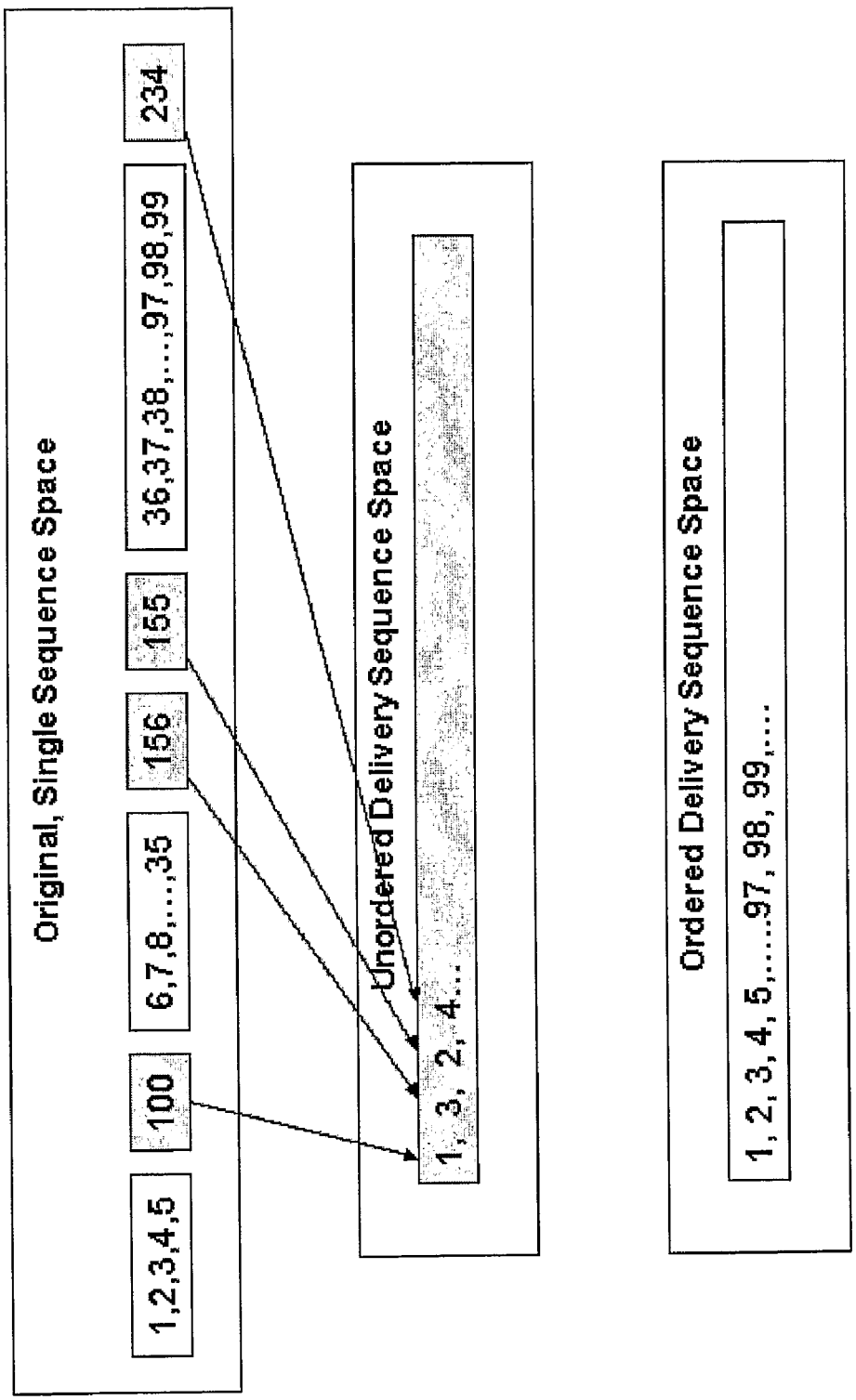
FIG. 7 illustrates an example of a separate sequence space for unordered delivered records according to an exemplary embodiment.

In accordance with a preferred, exemplary embodiment, separate the orderly delivered records and the unorderly delivered records within a secure stream into two record sequence spaces as illustrated in FIG. 7 and perform data security separately in these two different spaces. FIG. 7 illustrates an example of a separate sequence space for unordered delivered records according to an exemplary embodiment. It is only the sequence numbers in the unordered delivery sequence space that are explicitly included in the corresponding packets. The ordered delivery sequence space is merely handled internally by the security protocol and there are typically no explicit sequence numbers present in the ordered packets. The separation of sequence spaces is preferably accomplished by introducing an additional record type for unorderly delivered records. TLS, for example, has a 'type' field in the record header (see FIG. 4), which is used for identifying different record types (e.g. handshake messages, alert messages and application data). This field can also be used to specify that a record is an unordered record (there could be unordered versions of all the existing types, or completely different ones could be defined). The processing of unordered records can for example be implemented as an extension of a security protocol such as TLS and the use of this extension can be negotiated in-band during (TLS) handshake (which is done in the ordered delivery sequence space) to make it backward compatible with legacy (TLS) implementation. If a legacy (TLS) implementation is faced with unknown record types the connection will be terminated. This implies that a legacy (TLS) implementation will not crash ungracefully if it gets records of the new types. Alternatively, the use of the security processing extension for unordered delivery records may be negotiated by means of out-of-band signaling (e.g. SIP signaling).

Figure 8:
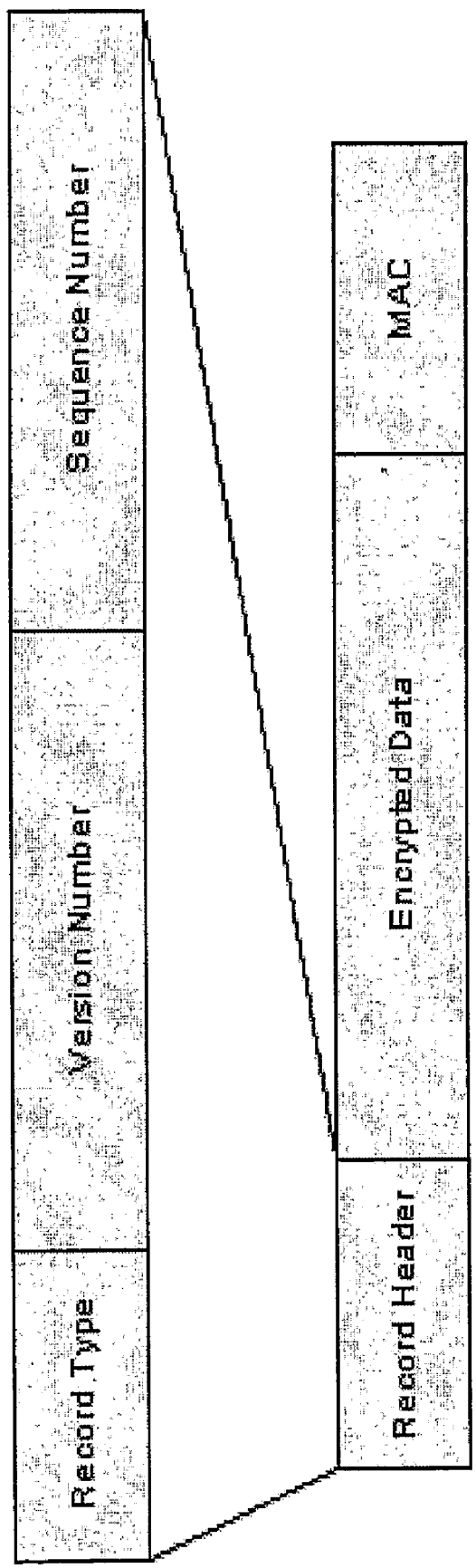
FIG. 8 showing an example of a new record header for (SCTP) unordered delivery according to an exemplary embodiment.

The new record header used for unordered delivery data records is preferably defined to include an explicit sequence number as illustrated in FIG. 8 showing an example of a new record header for (SCTP) unordered delivery according to an exemplary embodiment. For each unordered record, a sequence number is normally drawn from a sequence number space that is dedicated to unordered records. Other fields that are needed for security processing could also be included into this new record header (or fields from the legacy header could be excluded, for example, the record length could be excluded if the length of the record can be deduced from the underlying transport protocol) without affecting the interoperability with the legacy TLS record format.

Figure 9:
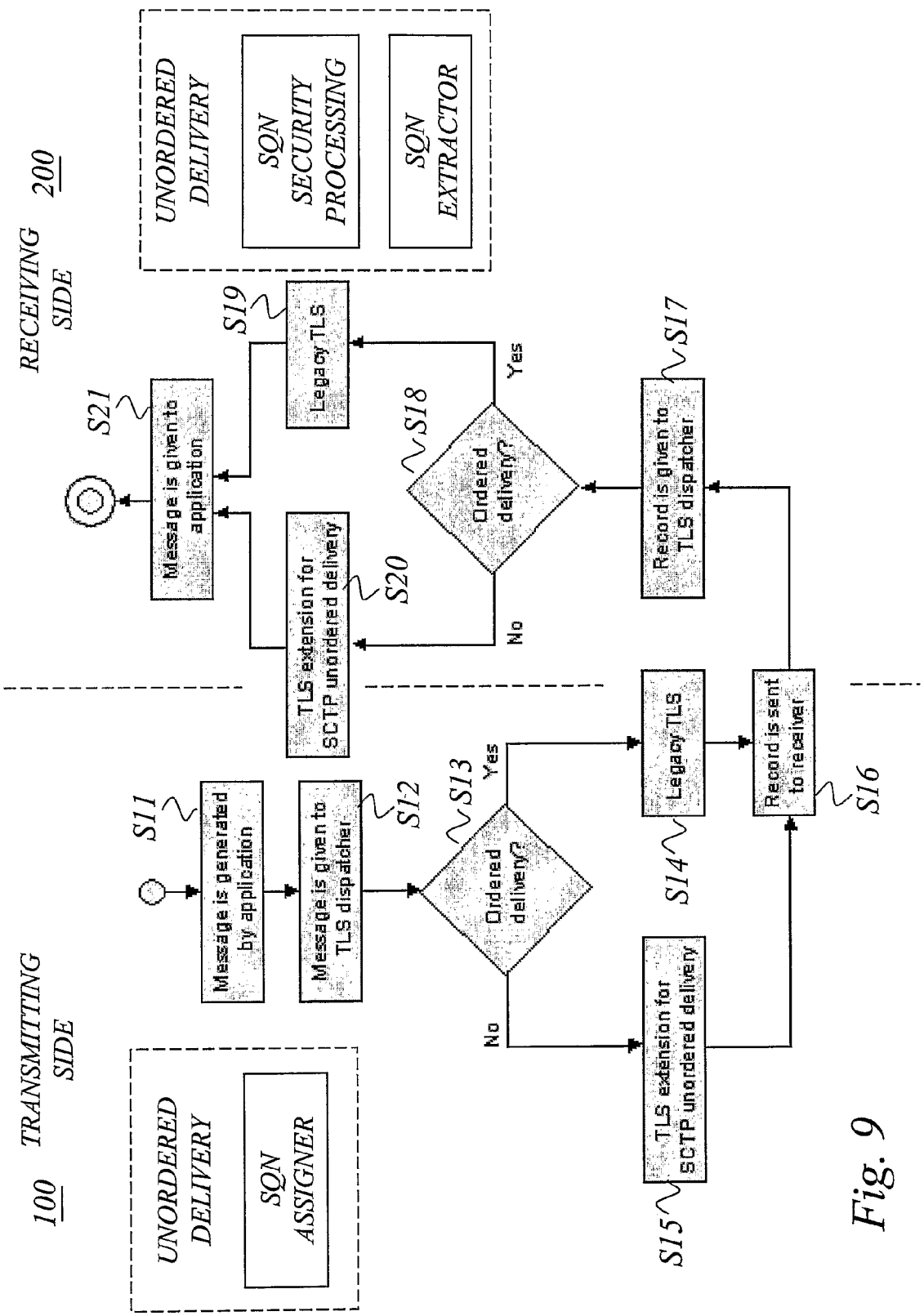
FIG. 9 illustrates a possible exemplary data flow according to the system with particular reference to TLS and SCTP.

A possible exemplary data flow of such a solution is illustrated in FIG. 9 with particular reference to TLS and SCTP. On the transmitting side 100, when the application (S11) sends a chunk of data to TLS (S12), it has to specify the type of delivery (i.e. ordered delivery or unordered delivery). For example, a special flag (0/1) may be set by the application, e.g. "0" for ordered delivery and "1" for unordered delivery. In the TLS implementation, the dispatcher is preferably extended. The dispatcher identifies the type of delivery (S13) and dispatches the data to legacy TLS protocol stack (S14) or the TLS extension for SCTP unordered delivery (S15) according to the type of delivery specified by the application. For unordered delivery (S15), each record is preferably assigned an explicit sequence number by a sequence number (SQN) assigner. Each record is subsequently sent to the receiver (S16).

On the receiving side 200, when TLS receives (S17) a SCTP message from the receiving function of SCTP, the dispatcher of records dispatches (S18) the data record to the legacy TLS protocol stack (S19) or the TLS extension for SCTP unordered delivery (S20) according to the type field of the record header. For unorderly delivered records (S20), the sequence number is extracted by a SQN extractor, and security processing is performed by a SQN security processing module, preferably including security functions such as replay protection, integrity protection and/or data dropping protection. Subsequently, the record is given to the application (S21).

In the ordered delivery sequence space, data records arrive in the same order as they are sent and can be handled properly by a normal TLS connection using the implicit sequence number scheme.

With reference to the TLS extension for SCTP unordered delivery, record arrival is normally reliable. However, it is not necessary for the unordered records to arrive in the same order as they are sent. To perform integrity protection over unordered delivered records, the format of TLS records should be changed so that it includes an explicit sequence number (this in comparison to the ordered delivery sequence, where the sequence numbers are monotonically increasing by one per record, and the sequence number hence can be kept as a state variable at the communicating endpoints). A difference that is required between the headers of the records of the two types is that the unordered records explicitly carry the sequence number.

Replay protection is preferably performed based on sequence number information using any accepted procedure for performing a replay protection check. To avoid simple denial-of-service attacks, integrity protection of the replay protection information should preferably also be included. If the MAC (see FIG. 8) is calculated over the sequence number, there will be integrity protection for this information by using ordinary keyed MAC verification. If an attacker modifies the sequence number (replay protection information), the MAC can not be verified and the protocol will then take appropriate actions.

Since the gap between sequence numbers in the unordered sequence can be arbitrarily large, it may not be feasible to keep a replay window of fixed size (c.f. ESP). Instead a conceptual list, e.g. in the form of a linked list, containing the gaps in received records could be kept for more efficient memory utilization. This conceptual list is then used to perform reliable replay protection. The decision, on which replay protection implementation that is to be used, can for example be made depending on the distribution of unordered and ordered records in the stream. The decision is preferably based on a priori knowledge of this distribution, which can be deduced from the knowledge of the application behavior.

Figure 10:
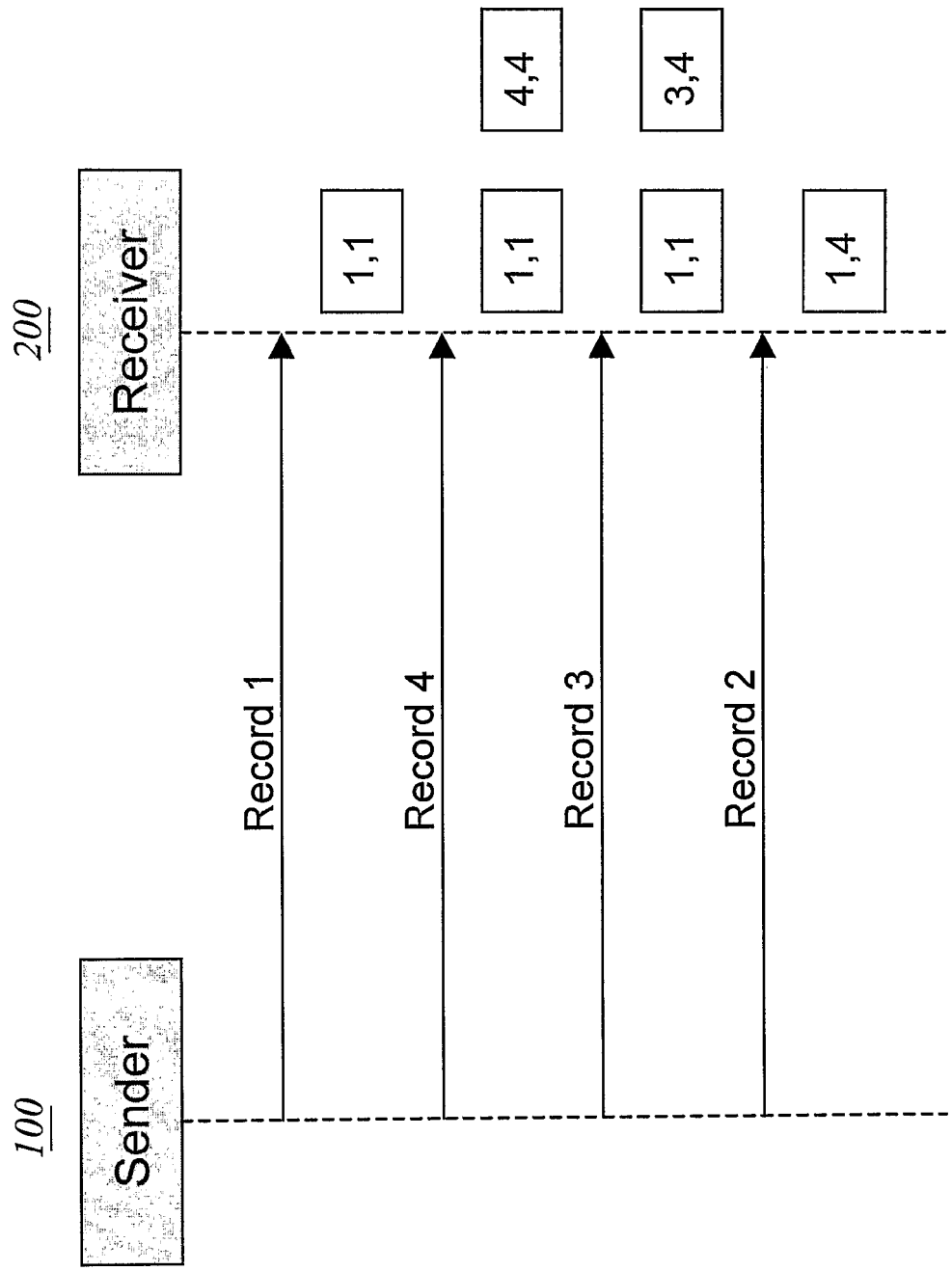
FIG. 10 shows how the receiver keeps a list of intervals of records it has received according to an exemplary embodiment.

FIG. 10 shows how the receiver keeps a list of intervals of records it has received (the first number in the pair indicates the lower limit of the interval and the second the upper limit) according to an exemplary embodiment. It also shows how the intervals can be merged when they are completed (see what happens when record 3 and record number 2 arrives). In other words, FIG. 10 illustrates an example of a replay list for unordered delivery where the receiver keeps track of which records it has seen.

Figure 11:
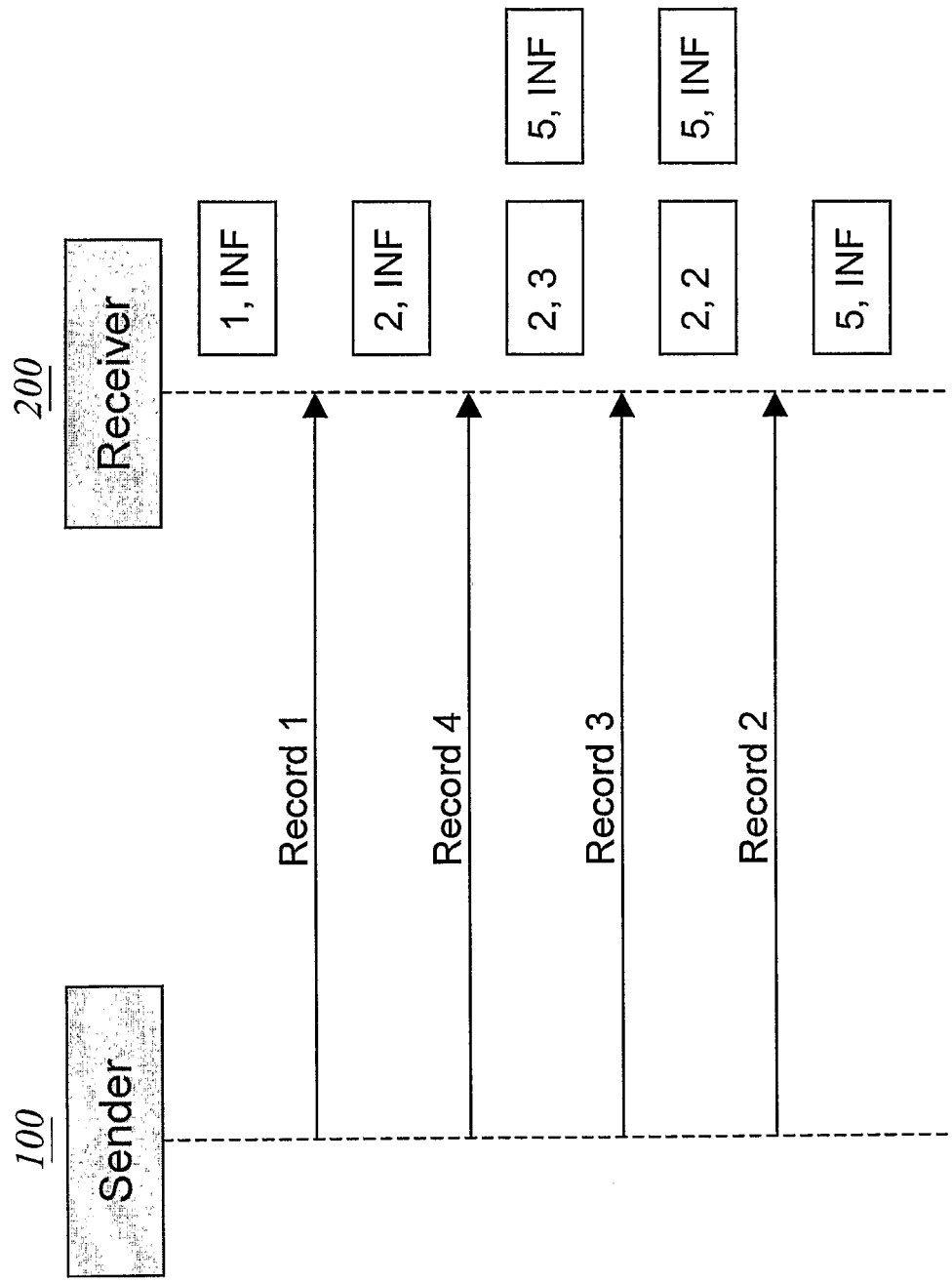
FIG. 11 illustrating an example of a replay list where the receiver notes which records it has not yet seen according to an exemplary embodiment.

An alternative is to keep a list of records that the receiver has not received. This is shown in FIG. 11 illustrating an example of a replay list where the receiver notes which records it has not yet seen. In FIG. 11, INF stands for the conceptual infinity, or the highest allowed sequence number. The highest sequence number could be interpreted in a modular way, e.g., if the sequence numbers starts at 0xfffe and the sequence number field is 16 bits wide, the "highest" sequence number could be for instance 0xfffd, i.e. the numbers wrap around modulo $2^{16}$.

For data dropping protection, a termination message for termination of a security protocol connection generally includes an end sequence number of the sent unordered data messages, and reliable reception of all sent records in the unordered record space may then be detected based on the end sequence number in the termination message. It should be understood that the set of sequence numbers is generally an ordered set, and the end sequence number is the "maximal" element with respect to that order.

Figure 12:
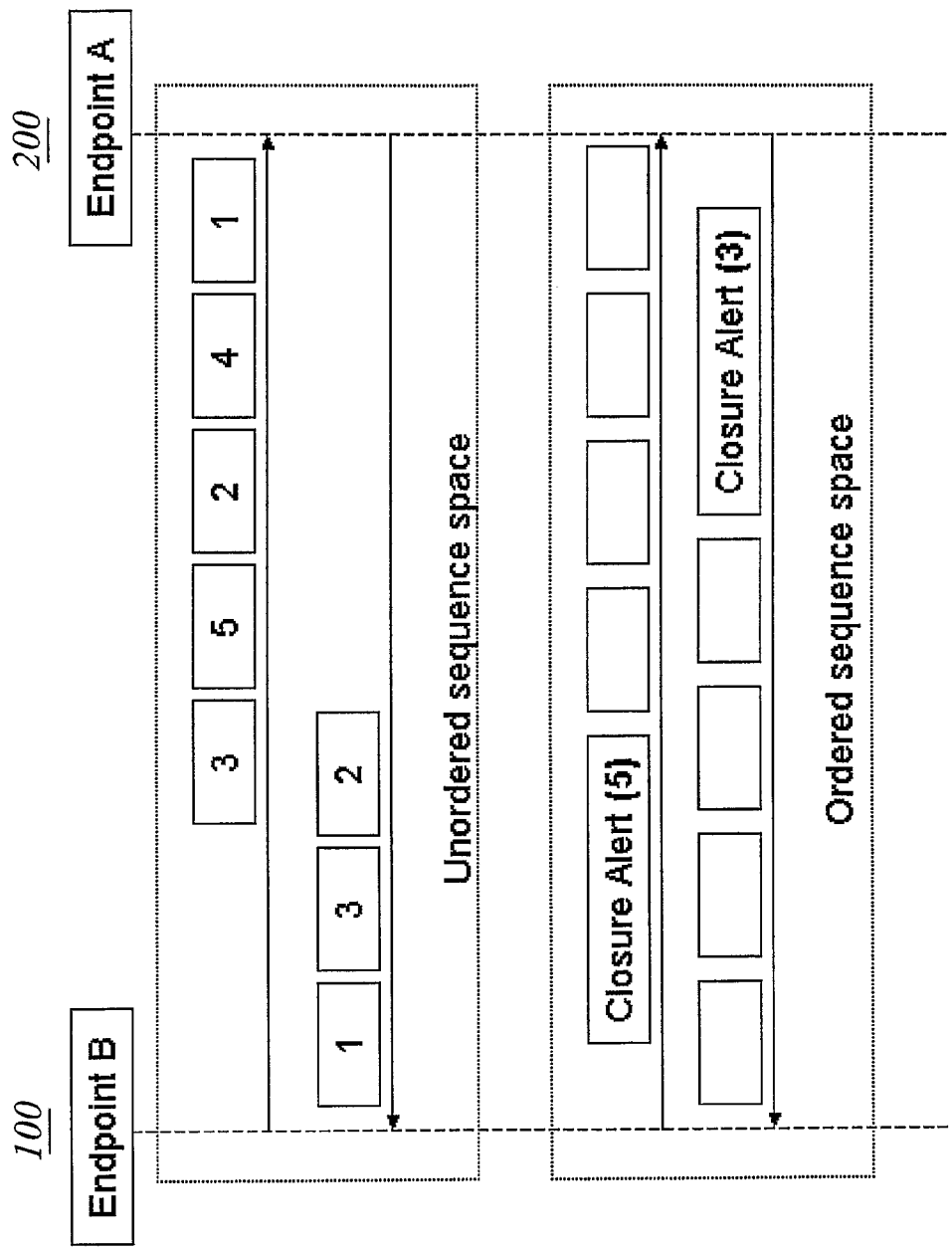
FIG. 12 showing an example of sending closure alert messages in the ordered space containing the highest sequence number of the unordered space.

In TLS, the termination message is typically referred to as a closure alert message. To perform detection of data dropping in the "TLS" context, the closure alert message sent by each communicating endpoint right before a "TLS" connection is closed should preferably contain the "highest" sequence number of unordered delivered messages sent, as illustrated in FIG. 12 showing an example of sending closure alert messages in the ordered space containing the highest sequence number of the unordered space. This is required for the endpoints to make sure that there are no unordered packets that have not reached an endpoint. For example, if endpoint A receives the Closure Alert containing the highest unordered sequence number sent by endpoint B (5 in the figure), it knows that it should not drop the connection until it has received all records from 1 to 5 in the unordered sequence.

Figure 13:
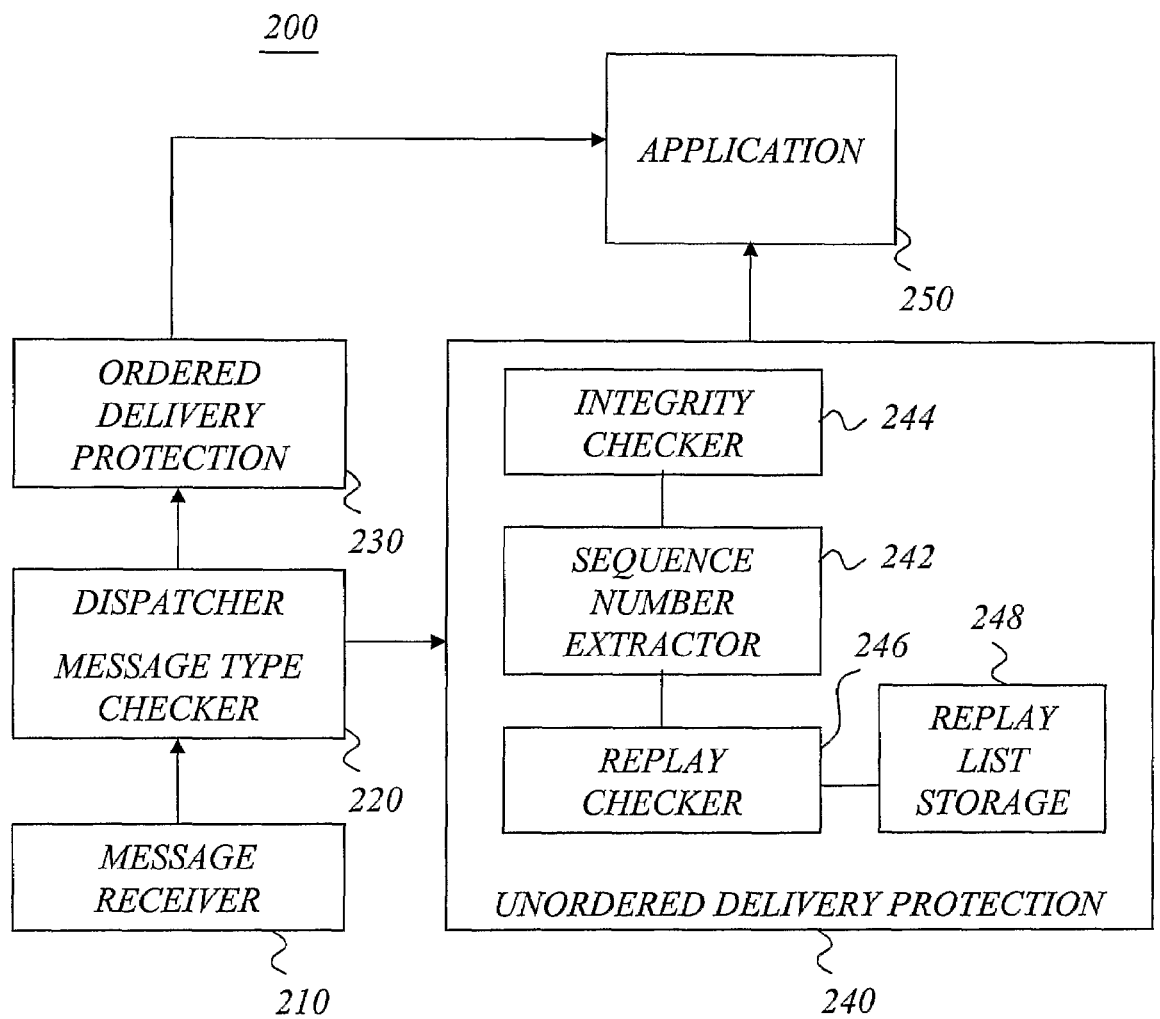
FIG. 13 is a schematic block diagram illustrating relevant parts of a receiver according to an exemplary embodiment.

FIG. 13 is a schematic block diagram illustrating relevant parts of a receiver according to an exemplary embodiment. In this particular example, the receiver 200 basically comprises a message receiver 210, a dispatcher 220, a module for ordered delivery protection 230, a module for unordered delivery protection 240 and an application module 250. The message receiver 210 includes the message receiving function of the transport protocol such as SCTP, and allows possible buffering of data messages or records. The message receiver forwards the data messages to the dispatcher 220 which checks the message type. The dispatcher dispatches the data message to the module 230 for ordered delivery (de) protection or module 240 for unordered delivery (de)protection, preferably according to the type field of the header of the data message. For example, the ordered delivery module 230 may implement the legacy TLS protocol stack, and the unordered delivery module 240 may implement a TLS extension for unordered delivery. Preferably, the module 240 for unordered delivery (de)protection includes a sequence number extractor 242, an integrity checker 244 (e.g. MAC verification), a replay checker 246 and an associated replay list storage 248. Once the data messages have been processed they are forwarded to the application 250.

Figure 14:
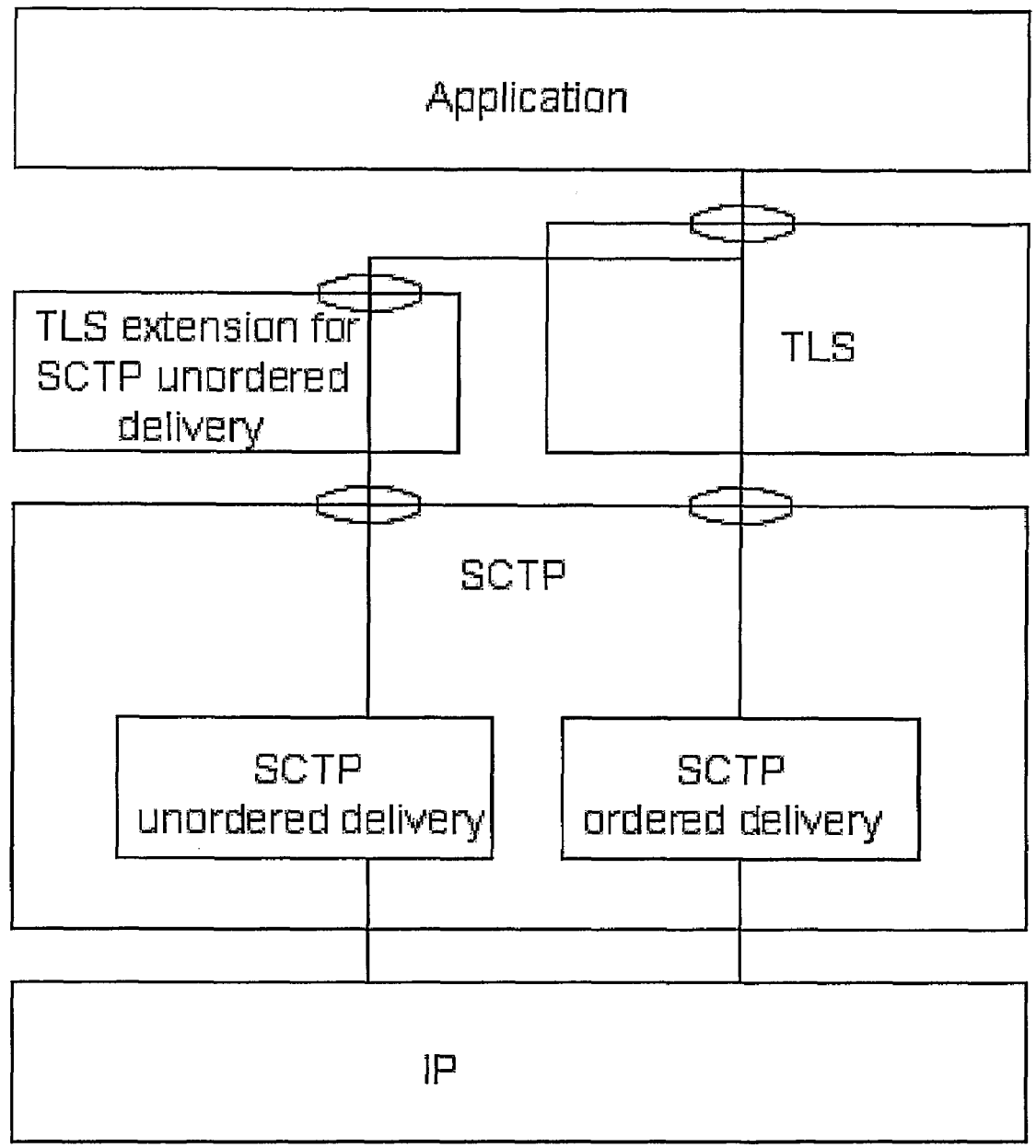
FIG. 14 schematically illustrates a separation of ordered and unordered delivery in both the security protocol and transport protocol for the exemplary combination of a TLS security protocol and a SCTP transport protocol.

In summary, the states of the transport protocol are separated into unordered and ordered delivery. The current security protocols of today however cannot do this distinction. A basic idea is therefore to extend the security protocol to allow this separation also at a higher layer, as exemplified in FIG. 14. FIG. 14 schematically illustrates a separation of ordered and unordered delivery in both the security protocol and transport protocol for the exemplary combination of a TLS security protocol and a SCTP transport protocol. A key point is to handle data messages using ordered delivery and messages using unordered delivery separately, no matter if one or two entry points is/are used to access the security protocol layer, implying that the two different message types should be either separated or maintained separate on the security protocol layer, at least during security processing. It is also readily understood that other combinations of security and reliable transport protocols can be made.

A difference between a security protocol extension, such as a TLS extension, for unordered delivery and the corresponding legacy security protocol, such as legacy TLS, is that the security protocol extension for unordered delivery (see e.g. FIGS. 9 and 14) performs the security processing required to deal with unordered delivery. As an example, the security protocol extension is preferably configured to:
  Process the explicit sequence number carried in the records.
  Carry out replay protection based on this sequence number (potentially using a scheme different from the scheme in e.g. legacy TLS, which scheme can be decided during the handshake).

The embodiments described above are merely given as examples, and it should be understood that the present system is not limited thereto. Further modifications, changes and improvements which retain the basic underlying principles disclosed and claimed herein are within the scope of the system.

REFERENCES

[1] R. Stewart, et al., "Stream Control Transmission Protocol", RFC 2960, IETF, October 2000.
[2] J. Rosenberg, et. al. "The Stream Control Transmission Protocol (SCTP) as a Transport for the Session Initiation Protocol (SIP)", Internet draft, IETF, January, 2005.

[3] 3GPP TS.33.220: "Generic Authentication Architecture (GAA); Generic bootstrapping architecture (Release 6)", September, 2004.

[4] S. Kent and R. Atkinson, "IP Authentication Header", RFC 2402, IETF, November 1998.

[5] S. Kent and R. Atkinson, "IP Encapsulating Security Payload (ESP)", RFC 2406, IETF, November 1998.

[6] T. Dierks and C. Allen, "The TLS Protocol—Version 1.0", RFC 2246, IETF, January 1999.

[7] A. Jungmaier, et al., "Transport Layer Security over Stream Control Transmission Protocol, RFC 3436, IETF, December 2002.

[8] E. Rescorla, N. Modadugu, "Datagram Transport Layer Security", Internet Draft, June 2004.

The invention claimed is:

1. A method for providing data security for a reliable transport protocol that supports ordered delivery of data as well as unordered delivery of data, comprising:
separating ordered delivery data and unordered delivery data in a security protocol running on top of the reliable transport protocol;
inserting a sequence number in a header of the unordered delivery data, the sequence number used for ensuring the arrival and processing of all unordered delivery data; and
performing, in said security protocol, a first type of security processing for ordered delivery data and a second different type of security processing for unordered delivery data.

2. The method of claim 1, wherein said reliable transport protocol is SCTP (Stream Control Transmission Protocol).

3. The method of claim 1, wherein said security protocol is based on TLS (Transport Layer Security) with a security processing extension for unordered delivery.

4. The method of claim 1, wherein said reliable transport protocol is SCTP (Stream Control Transmission Protocol), and said security protocol is based on TLS (Transport Layer Security) with legacy security processing for SCTP ordered delivery and a security processing extension for SCTP unordered delivery.

5. The method of claim 4, wherein the use of the security processing extension is negotiated during session set-up.

6. The method of claim 1, wherein data messages using ordered delivery and data messages using unordered delivery within a secure data stream are separated into two message sequence spaces on the security protocol, and data security processing is performed differently in these two spaces.

7. The method of claim 6, wherein the security processing for unordered data messages is based on processing of the sequence numbers carried by unordered data messages.

8. The method of claim 7, wherein a conceptual list of those messages that have been received, or alternatively of those messages that have not been received, is maintained for effectuating replay protection for unordered data messages.

9. The method of claim 7, wherein a termination message for termination of a security protocol connection includes an end sequence number of the sent unordered data messages, and reliable reception of all sent records in the unordered record space is detected based on the end sequence number in the termination message.

10. The method of claim 6, wherein unordered data messages are identified by introduction of a special message type dedicated to unordered messages, each of said unordered messages comprising the sequence number assigned from a special sequence number space dedicated to unordered messages.

11. A system for providing data security for a reliable transport protocol that supports ordered delivery of data as well as unordered delivery of data, the system comprising:
a memory; and
one or more processors configured to execute a program for providing data security for the reliable transport protocol, the one or more processors configured to:
separate ordered delivery data and unordered delivery data in a security protocol on top of the reliable transport protocol;
insert a sequence number in a header of the unordered delivery data, the sequence number used for ensuring the arrival and processing of all unordered delivery data; and
perform, in said security protocol, a first type of security processing for ordered delivery data and a second different type of security processing for unordered delivery data.

12. The system of claim 11, wherein said reliable transport protocol is SCTP (Stream Control Transmission Protocol), and said security protocol is based on TLS (Transport Layer Security) with legacy security processing for SCTP ordered delivery and a security processing extension for SCTP unordered delivery.

13. A receiver configured to operate based on a reliable transport protocol that supports ordered delivery of data as well as unordered delivery of data, the receiver comprising:
a memory; and
one or more processors configured to execute a program for operating the receiver based on the reliable transport protocol, the one or more processors configured to:
separate ordered delivery data and unordered delivery data in a security protocol on top of the reliable transport protocol;
extract a sequence number from a header of the unordered delivery data, the sequence number used for ensuring the arrival and processing of all unordered delivery data;
perform a first type of security processing in said security protocol for ordered delivery data; and
perform a second different type of security processing in said security protocol for unordered delivery data.

14. The receiver of claim 13, wherein said receiver is configured to operate based on SCTP (Stream Control Transmission Protocol), and said receiver is configured to run legacy TLS (Transport Layer Security) security processing for SCTP ordered delivery and a TLS security processing extension for SCTP unordered delivery.

15. The receiver of claim 13, wherein the receiver is configured for separating data messages using ordered delivery and data messages using unordered delivery within a secure data stream into two message sequence spaces on the security protocol.

16. The receiver of claim 15, wherein the receiver is configured for identifying unordered data messages based on detection of a special message type dedicated to unordered messages, each of said unordered messages comprising the sequence number assigned from a special sequence number space dedicated to unordered messages.

17. The receiver of claim 15, wherein security processing for unordered data messages is based on processing of the sequence numbers carried by unordered data messages.

18. The receiver of claim 17, further configured to maintain a conceptual list of those messages that have been received, or alternatively of those messages that have not been received, to effectuate replay protection for unordered data messages.

19. A transmitter configured to operate based on a reliable transport protocol that supports ordered delivery of data as well as unordered delivery of data, the transmitter comprising:
   a memory; and
   one or more processors configured to execute a program for operating the transmitter based on the reliable transport protocol, the one or more processors configured to:
      separate data intended for ordered delivery and data intended for unordered delivery in a security protocol on top of the reliable transport protocol;
      insert a sequence number in a header of the unordered delivery data, the sequence number used for ensuring the arrival and processing of all unordered delivery data;
      perform a first type of security processing in said security protocol for ordered delivery of data; and
      perform a second different type of security processing in said security protocol for unordered delivery of data.

20. The transmitter of claim 19, wherein said transmitter is configured to operate based on SCTP (Stream Control Transmission Protocol), and said transmitter is configured to run legacy TLS (Transport Layer Security) security processing for SCTP ordered delivery and a TLS security processing extension for SCTP unordered delivery.

21. The transmitter of claim 19, wherein the transmitter is configured for assigning the sequence numbers only to unordered data messages.

22. A security protocol dispatcher configured to operate in conjunction with a reliable transport protocol that supports ordered delivery of data as well as unordered delivery of data, the security protocol dispatcher comprising:
   a memory; and
   one or more processors, the one or more processors configured to:
      insert a sequence number in a header of unordered delivery data, the sequence number used for ensuring the arrival and processing of all unordered delivery data; and
      dispatch data to a first type of security protocol processing for ordered delivery or to second different type of security protocol processing for the unordered delivery according to indicated type of delivery.

23. The security protocol dispatcher of claim 22, wherein the Security protocol dispatcher is configured to dispatch data for ordered delivery to legacy TLS (Transport Layer Security) security processing and data for unordered delivery to a TLS security processing extension.

* * * * *

UNITED STATES PATENT AND TRADEMARK OFFICE
CERTIFICATE OF CORRECTION

| | |
|---|---|
| PATENT NO. | : 8,352,727 B2 |
| APPLICATION NO. | : 11/883052 |
| DATED | : January 8, 2013 |
| INVENTOR(S) | : Chen et al. |

It is certified that error appears in the above-identified patent and that said Letters Patent is hereby corrected as shown below:

In the Claims

In Column 12, Line 20, in Claim 23, delete "Security" and insert -- security --, therefor.

Signed and Sealed this
Eighteenth Day of February, 2014

Michelle K. Lee
*Deputy Director of the United States Patent and Trademark Office*